(12) United States Patent
Elkmann et al.

(10) Patent No.: US 11,310,887 B2
(45) Date of Patent: Apr. 19, 2022

(54) DEVICE FOR SECURING A SAFETY AREA AROUND AT LEAST ONE AUTOMATICALLY OPERATING MACHINE

(71) Applicant: Fraunhofer-Gesellschaft zur Förderung der angewandten Forschung e.V., Munich (DE)

(72) Inventors: Norbert Elkmann, Magdeburg (DE); Christian Vogel, Magdeburg (DE); Markus Fritzsche, Magdeburg (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 367 days.

(21) Appl. No.: 15/750,717

(22) PCT Filed: Aug. 10, 2016

(86) PCT No.: PCT/EP2016/069015
§ 371 (c)(1),
(2) Date: Feb. 6, 2018

(87) PCT Pub. No.: WO2017/025551
PCT Pub. Date: Feb. 16, 2017

(65) Prior Publication Data
US 2019/0018382 A1 Jan. 17, 2019

(30) Foreign Application Priority Data

Aug. 10, 2015 (DE) .................... 10 2015 215 234.0

(51) Int. Cl.
*H05B 47/115* (2020.01)
*F16P 3/14* (2006.01)
(Continued)

(52) U.S. Cl.
CPC ............ *H05B 47/115* (2020.01); *F16P 3/142* (2013.01); *F16P 3/144* (2013.01); *G05B 19/048* (2013.01);
(Continued)

(58) Field of Classification Search
CPC ........ G05B 19/048; G05B 2219/40196; G08B 21/22; H05B 45/00; H05B 47/105; F16P 3/142; F16P 3/144
See application file for complete search history.

(56) References Cited

U.S. PATENT DOCUMENTS 5,880,954 A * 3/1999 Thomson ................ F16P 3/144
700/79
6,243,011 B1 * 6/2001 Rostroem ................ B21D 5/02
250/559.12
(Continued)

FOREIGN PATENT DOCUMENTS

| CN | 100549491 C | 10/2009 |
| CN | 103456116 A | 12/2013 |

(Continued)

OTHER PUBLICATIONS

DE-102013104265-A1 (Year: 2014).*
(Continued)

*Primary Examiner* — Jeff A Burke
*Assistant Examiner* — Kyle T Johnson
(74) *Attorney, Agent, or Firm* — Schwegman Lundberg & Woessner, P.A.

(57) ABSTRACT

The invention relates to a device for securing a safety area around at least one automatically operating machine (3), comprising an illuminating marking (4; 5) of the safety area and/or a boundary of the safety area, a sensor-based monitoring device for detecting a breach of the safety area, and a control device (1) for controlling the machine (3), for
(Continued)

defining the safety area, for controlling a shape, structure and/or a location of the illuminating marking, and for changing the operating state of the machine (3) or the light source (6, 7) in a manner which is dependent on a detection of a breach of the safety area by way of the monitoring device. The device is characterised in that a multiplicity of light sources (6, 7) which can be actuated in a spatially resolved manner and in each case comprise an inactive and at least one active operating mode are arranged on or in the surface (2) which delimits the safety area, wherein the operating mode of the light sources (6, 7) can be controlled by way of the control device (1), and the illuminating marking (4; 5) is configured as at least one of the light sources (6, 7) in an active operating mode.

20 Claims, 4 Drawing Sheets

(51) Int. Cl.
  *G05B 19/048* (2006.01)
  *G08B 21/22* (2006.01)
  *H05B 45/00* (2020.01)
(52) U.S. Cl.
  CPC ............. *G08B 21/22* (2013.01); *H05B 45/00* (2020.01); *G05B 2219/40196* (2013.01)

(56) References Cited

U.S. PATENT DOCUMENTS

| | | | |
|---|---|---|---|
| 9,596,451 B2 | 3/2017 | Walter et al. | |
| 9,616,350 B2* | 4/2017 | Stenzler | G06K 9/3216 |
| 10,321,275 B1* | 6/2019 | Orlov | G01S 13/878 |
| 2002/0125435 A1* | 9/2002 | Cofer | G08B 13/19686 |
| | | | 250/341.1 |
| 2003/0024421 A1* | 2/2003 | Braune | G01V 8/20 |
| | | | 100/348 |
| 2003/0209893 A1* | 11/2003 | Breed | B60J 10/00 |
| | | | 280/735 |
| 2006/0082465 A1* | 4/2006 | Grzan | H01H 3/141 |
| | | | 340/665 |
| 2010/0194583 A1* | 8/2010 | Kawabata | F16P 3/144 |
| | | | 340/3.6 |
| 2011/0298579 A1* | 12/2011 | Hardegger | G01S 17/10 |
| | | | 340/3.1 |
| 2013/0201292 A1* | 8/2013 | Walter | G01S 17/04 |
| | | | 348/47 |
| 2016/0214259 A1* | 7/2016 | Yamamoto | F16P 3/144 |
| 2017/0120460 A1* | 5/2017 | Burmeister | G08B 21/02 |
| 2017/0246329 A1* | 8/2017 | Lloyd | A61L 2/10 |
| 2017/0248936 A1* | 8/2017 | Hoshino | G05B 19/4061 |
| 2019/0018382 A1* | 1/2019 | Elkmann | G08B 21/22 |

FOREIGN PATENT DOCUMENTS

| | | | | |
|---|---|---|---|---|
| CN | 106538063 B | * | 11/2019 | ........... H05B 47/115 |
| DE | 102013104265 A1 | * | 10/2014 | ............... G05B 9/02 |
| DE | 102013104265 A1 | | 10/2014 | |
| EP | 2147502 A2 | | 1/2010 | |
| EP | 2558886 A2 | | 2/2013 | |
| EP | 3298431 A1 | * | 3/2018 | ............. G01S 17/04 |
| JP | 2006285635 A | | 10/2006 | |
| WO | WO-2007085330 A1 | | 8/2007 | |
| WO | WO-2008138647 A3 | | 11/2008 | |
| WO | WO-2016000770 A1 | | 1/2016 | |

OTHER PUBLICATIONS

CN-106538063-B (Year: 2019).*
"International Application No. PCT/EP2016/069015, International Search Report dated Nov. 16, 2016", w/ English Translation, (Nov. 16, 2016), 6 pgs.
"International Application No. PCT/EP2016/069015, Written Opinion dated Nov. 16, 2016", (Nov. 16, 2016), 6 pgs.
"Schaltmatten SM", Mayser Plymer Electric Produktinformation, 20 pgs.
"International Application No. PCT/EP2016/069015, International Preliminary Report on Patentability dated Feb. 13, 2018", (Feb. 13, 2018), 6 pgs.
"Chinese Application Serial No. 201680047133.1, Office Action dated Apr. 26, 2020", w/English Translation, (Apr. 26, 2020), 19 pgs.
"Chinese Application Serial No. 201680047133.1, Office Action dated Feb. 22, 2021", w/English Translation, (Feb. 22, 2021), 19 pgs.

* cited by examiner

DEVICE FOR SECURING A SAFETY AREA AROUND AT LEAST ONE AUTOMATICALLY OPERATING MACHINE

PRIORITY APPLICATIONS

This application is a U.S. National Stage Filing under 35 U.S.C. 371 from International Application No. PCT/EP2016/069015, filed on Aug. 10, 2016, and published as WO2017/025551 on Feb. 16, 2017, which claims the benefit of priority to German Application No. 10 2015 215 234.0, filed on 10 Aug. 2015; which applications and publication are incorporated herein by reference in their entirety.

The invention relates to a device for securing a safety area around an automatically operating machine, in particular in a working area used jointly by humans and machines, according to the preamble of the main claim.

In workspaces used jointly by humans and machines, such as autonomously operating machines and/or robots, the possibility of humans being injured by the machines must be ruled out at all times. In this regard, injuries can be caused for example by collisions between humans and machines or also by flying sparks created by the work performed by the machine.

In order to prevent injuries of this kind, a safety area is defined for each machine, wherein the safety area can be static or dynamic depending on the current work or a movement of the machine. The safety area is then monitored by means of various safety techniques, for example laser scanners, light barriers, camera-based sensor systems, projection-based sensor systems, or tactile floor coverings. These safety techniques detect the distance of a person from the hazard and, in the event of a detected breach of the safety area, a safety-relevant function of the machine is triggered, for example the machine is switched to an emergency off state, the work of the machine is slowed, or an endangering part of the machine is stopped or physically removed. For humans, however, this safety distance in most cases is not perceptible or is only insufficiently perceptible. In practice, it is therefore often the case that a person accidentally enters the safety area of a machine and thus involuntarily brings the system to a standstill.

Document EP 2558886 B1 provides a device for monitoring a three-dimensional hazard area. The monitoring is performed here by projected light markings, which are monitored by a camera system. A device for securing a safety area in which an automatically working machine is located is hereby described, wherein this safety device comprises a visible or invisible illuminating, projected marking. This marking is arranged on a surface delimiting the safety area and marks at least part of the safety area and/or at least part of a boundary of the safety area. Furthermore, EP 2558886 B1 discloses a control device which can be used to control the machine, to define the safety area from an operating state of the machine and/or to control a shape, structure and/or a location of the illuminating marking.

The object of the present application is to create a device for securing a safety area, which device is of simple structure and ensures that the safety area is made visible.

This object is achieved by the features of the main claim. Advantageous developments are described by the dependent claims.

In the device for securing a safety area or for marking the safety area according to the preamble of the main claim of the present application, a multiplicity of light sources which can be actuated in a spatially resolved manner is arranged on the surface which delimits the safety area, for example a floor, a wall, a table and/or a face of the machine. Each of these light sources comprises at least one inactive operating state, for example "off" or "standby", and at least one active operating state, for example "on" or "flashing", wherein the operating state of the light sources can be controlled by the control device. Here, the marking is formed as at least one of the light sources in an active operating mode.

For example reference can be made to a marking of the safety area provided this is merely marked, and for example reference can be made to a securing if the marking highlights the safety area and thus secures it. Furthermore, reference can also be made to a securing if the safety area, in addition to the marking, also comprises a device for monitoring the safety area.

The illuminating marking is thus self-illuminating and can be controlled directly. A shadowing of the marking by the machine to be secured can be avoided.

In the event of an autonomous movement of the machine located in the safety area or of a movement of said machine caused in another way, in response to the movement and/or the associated change to the operating state of the machine, the safety area and/or the illuminating marking can be changed by the control device dynamically and in correspondence with the movement of the machine.

A dynamic safety area is thus created which is adapted at all times to the current hazard situation posed by the machine. A movement of the machine in the above sense can change the location of the machine, but does not have to do this. Rather, it is also possible that the machine remains in the same place and only part of the machine moves, for example a gripper arm or a saw blade. A change to the safety area can be indicated by a movement of this kind, for example in order to secure the radius of action of a machine part or a region in which flying sparks or flying chips are anticipated.

It is also possible that the control device is furthermore configured to change the safety area of the machine depending on a change to the operating state of the machine. For example, a switched-off machine does not need a safety area or only needs a very small safety area. When starting the machine, the safety area is automatically enlarged by the control device depending on the operating data of the machine. Already in standby mode, a larger safety area can be indicated so that no individuals are located in the direct vicinity of the machine when said machine is started.

The various desired safety areas for the possible operating states of a machine can be defined individually and as appropriate can be changeable within the legally required standards by an appropriately trained user.

If the safety area is changed, the illuminating marking is preferably automatically adjusted to the new safety area. Here, the illuminating marking and/or the operating mode of at least one of the light sources can be changed. For example, light sources which are no longer required for the marking of the new safety area are switched off by the control device, and other light sources, which previously were in an inactive operating mode, are switched into an active operating mode by the control device.

Here, it is possible that the old safety area initially remains visible, which can be advantageous, especially when switching off a machine, when hazards such as waste products created during operation of the machine can still remain within the old safety area.

It can also be advantageous if the operating mode of each of the light sources can be controlled individually by the control unit. A high flexibility in the design of the illuminating marking is achieved by individual controllability. Alternatively, it is also possible that the light sources can be controlled in blocks or rows. It is also possible, in the case that the light sources can be controlled individually, to define groups of individual light sources in order to simplify the control of light sources, which are usually actuated jointly.

The light sources can also be modulated in respect of their colour, brightness and/or frequency. It is thus possible to mark different safety areas differently or to convey additional information in a colour-coded and/or visualised manner to a person by means of the marking. For example, different colours can be used for different levels of risk.

It is also possible, in addition to the marking of the safety area, to also convey further information to a person by means of the light sources, for example information relating to the expected service life of a machine, relating to a necessary maintenance of the machine, or relating to the type of hazard posed by the machine. This additional information can be transmitted to a user for example in the form of pictograms or illuminating lettering.

It is furthermore also possible to mark a security area invisibly to the human eye by means of infrared light, for example when individuals reside in the vicinity of the safety area or when a visibly illuminating marking would be disruptive to the workflows in an area.

The marking of a security area can be two-dimensional or can be provided by lines, contours or patterns, wherein, depending on the design of the space and the safety area, it is not necessary for a complete circle to be made in order to mark a boundary of the safety area.

Furthermore, the control device can be configured to divide the safety area into at least a first and a second safety area, for example depending on a movement and/or a change to the operating state of the machine, wherein at least part of the first safety area and/or at least part of a boundary of the first safety area, and at least part of the second safety area and/or at least part of a boundary of the second safety area is marked by the illuminating marking.

In some machines it is advantageous if the safety area around the machine is divided into a plurality of safety levels, so that, in the event that a breach of an area of a low safety level is detected by the control device, a different response is provided compared to when a breach of an area of a higher safety level is detected.

Here, it is possible that at least two different safety areas and/or safety levels of a safety area that are disjunct, nested one inside the other and/or overlapping are marked by different colours, brightnesses and/or frequencies of the light sources.

A user can better estimate the hazard potential of the individual machines and/or areas of the workspace on the basis of the marking of different safety areas and/or safety levels by means of different colours.

The light sources can preferably be dot-like, for example provided in the form of single-colour or multi-colour LEDs. The use of RGB LEDs, which can reproduce a particularly broad colour spectrum, can be advantageous here. By means of small illuminating dots of this kind, markings can be formed in a particularly flexible and precise manner.

Furthermore, the light sources can be arranged regularly and/or in a matrix-like manner on or in the surface delimiting the safety area, and preferably can be arranged closely, for example with a spacing of at most 10 cm, preferably at most 5 cm. The spacing can preferably be selected so that it is expected with high likelihood that at least one of the light sources will be covered at least temporarily—for example by a person or an object separate from the machine—in the event of a breach of the safety area.

It is thus possible to provide a working area with light sources over a large area, which light sources then can be activated by the control device depending on one or more safety areas so as to mark the safety area(s).

In order to equip a working area two-dimensionally with light sources in the simplest possible way, the light sources can be arranged on light mats, which can be easily laid and connected. For example, the light mats can be provided in the form of tiles or in the form of rolled webs and can then be laid, arranged and optionally fastened on a surface, for example a floor, a wall, a work table or any other surface of the working area.

It is also possible that the safety device comprises a sensor-based monitoring device, by means of which a breach of the safety area can be detected. Depending on a detection of a breach of the safety area by the monitoring device, for example in the event that a person infiltrates a safety area, a safety-relevant function can be triggered by the control device, for example the operating state of the machine located in the safety area can be changed, the operating mode of at least one of the light sources can be changed, or an alarm can be triggered.

In the event of detection of a breach of the safety area, the machine can preferably be switched off or transferred into another safe operating state, as appropriate in combination with a change in the shape, structure and/or location of the illuminating marking.

Furthermore, an acoustic or visual alarm can be triggered for example. Here, the visual alarm can also involve the illuminating marking, for example by flashing of the illuminating marking. The attention of a user can be directed to the marking and the safety area in a locally limited manner by means of a visual alarm. With use of an acoustic alarm, the alarm can also be observed at greater distance.

Here, the monitoring device can be a spatially resolving, touch-sensitive sensor system, for example as described in EP2147502 B1. A sensor system of this kind consists of a multiplicity of sensor cells, which are arranged on or in the surface delimiting the safety area. Here, the sensor cells can be arranged for example in the form of tactile sensor mats, by means of which the force and location of contact can be detected.

A breach of the safety area can be detectable with the aid of the touch-sensitive sensor system when contact above a defined threshold value is detected by the sensor system. Here, the threshold value can be selected so that the entering of the safety area by a person can be detected. By contrast, light contact can be tolerated by the monitoring device in order to prevent an unjustified shutdown of the machine.

It can be advantageous if each of the multiplicity of sensor cells is locally assigned at least one of the light sources. It is thus possible that the sensor cells are larger than or the same size as the individual light sources. By means of the control device, the individual sensor cells and the associated light sources can be functionally coupled, so that an automatic marking of an area in which contact has been detected is possible.

Separate sensor mats and light mats can be applied one above the other to the surface delimiting the safety area. Here, it is advantageous if the mats are created so that the upper mat does not hinder the functionality of the lower mat. To this end, the mats for example can be made very thin and/or transparent.

Furthermore, it is possible to form the light sources and touch-sensitive sensor cells in combined light-sensor mats, which can be laid on the surface delimiting the safety area. By means of combined light-sensor mats, it is possible avoid the above-described problems when laying two layers. In addition, with combined light-sensor mats, the functional linking of sensor cells and light sources can be provided directly.

It is furthermore also possible that the monitoring device comprises a recording device, for example at least one camera for visually monitoring the safety area or a laser scanner. By means of a recording device, movements of humans and machines in the working area can be detected, and an approach of a human to a machine or an entering and/or other breach of the safety area around a machine by the human can be detected.

With use of a recording device by the monitoring device, a breach of the safety area can be detected by the monitoring device, for example when at least a predefined number of the light sources marking the safety area are not detected by the recording device. In this regard, the detection can be provided for example similarly to the method described in EP 2558886 B1 for comparison of an actual image with a target image.

In order to increase the safety, it is also possible to secure a safety area simultaneously by a touch-sensitive sensor system and a recording device. Here, the risk of failure of the monitoring device is minimised, thus resulting in a higher safety category.

Although a device for securing a safety area has mostly been discussed up to this point, the application also comprises the use of a device for securing the safety area in accordance with this description or one of the claims during operation of a machine. To this end, the marking of the safety area is displayed and adjusted depending on the location of the machine (for example of a robot that is equipped for example with a tool). Embodiments of the use can be found within this application.

The application furthermore also comprises a method for securing a safety area. Here, a device for securing a safety area in accordance with the application can be used.

A safety area of a machine is firstly defined, which safety area can be defined for example by the radius of action of part of the machine (such as a robot arm) and optionally an additional safety distance. Here, the safety area can be measured or detected either externally, i.e. with a monitoring device, or can be transmitted by the machine to a control device of a device for securing the safety area.

Once the safety area has been defined, the control device actuates light sources which are arranged on a surface encompassing the safety area. On account of the actuation by the control device, the light sources for example can mark a boundary of the safety area, the entire safety area, or the safe area surrounding the safety area.

In various embodiments the safety area is newly defined for example depending on the configuration of the machine (for example when a robot arm changes tool) or depending on the machine location, and the new or updated safety area is detected and marked by the control device. Further embodiments can be found within the application.

Embodiments which are described within the scope of a use or a method can also be claimed in the device according to any one of the claims.

Further advantageous embodiments will be described hereinafter with reference to the drawings, in which.

Figure 1:
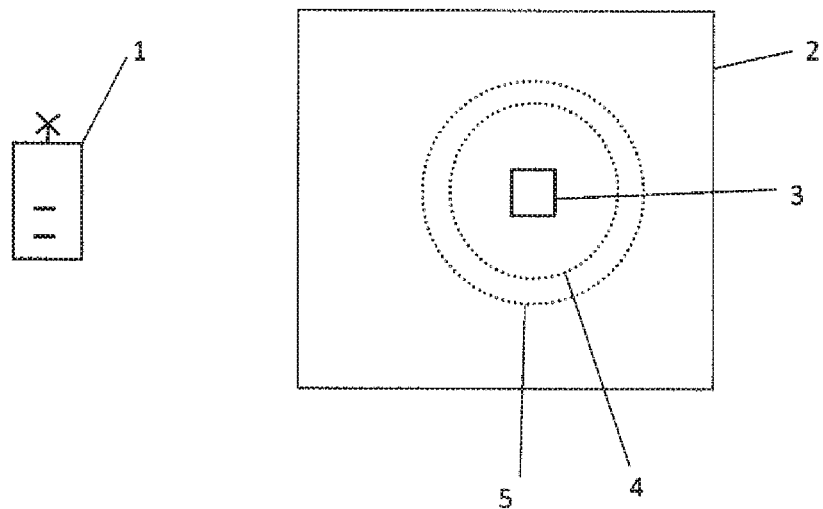
FIG. 1 shows a plan view of a safety area around a machine with illuminating markings.
Figure 2:
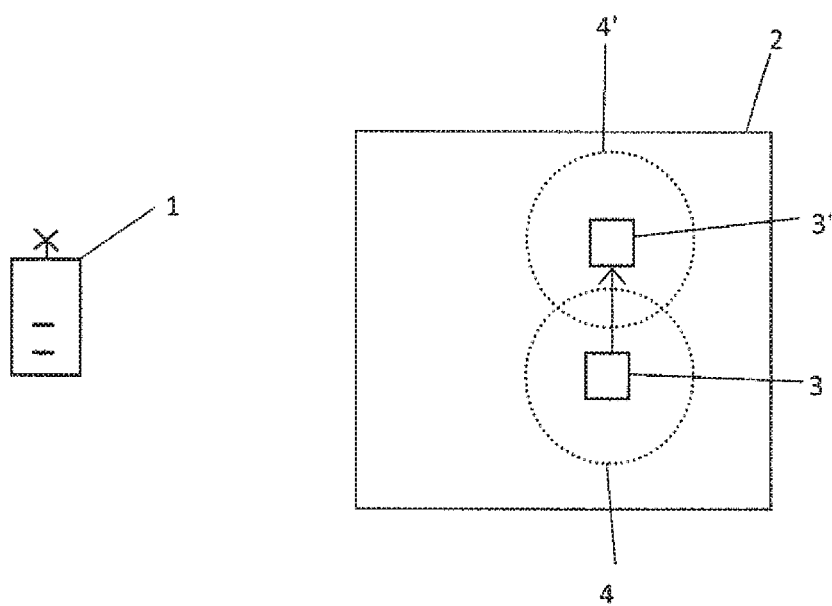
FIG. 2 shows a change to the safety area upon a movement of the machine.

FIG. 1 shows a floor 2 of a working area used jointly by humans and robots. A robot 3 is located in this working area. For example, a two-level safety area of the robot 3 is defined by a control device 1 on the basis of the operating state of the robot 3. The control device controls LEDs, which are arranged on the floor in such a way that two illuminating marking circles 4, 5 mark the safety area of the robot. Here, the inner marking 4 illuminates red and thus displays a high safety level, whereas the outer marking 5 illuminates yellow and thus indicates a lower safety level. In addition, further LEDs are arranged on the floor 2, which are not currently used for marking of the safety area and are not illustrated in the drawing.

The safety area around the robot 3 is clearly visible to a person by means of the markings 4, 5, and therefore the risk of the safety area being accidentally entered is reduced.

If the robot 3 now moves to a new position 3' in the working area, a new safety area is thus defined by the control device 1 and marked by an illuminating LED marking 4'. The old illuminating LED marking 4 is switched off by the control device in response to the movement of the robot. The marking 4, 4' can thus dynamically indicate the current safety area of the robot 3.

Figure 3:
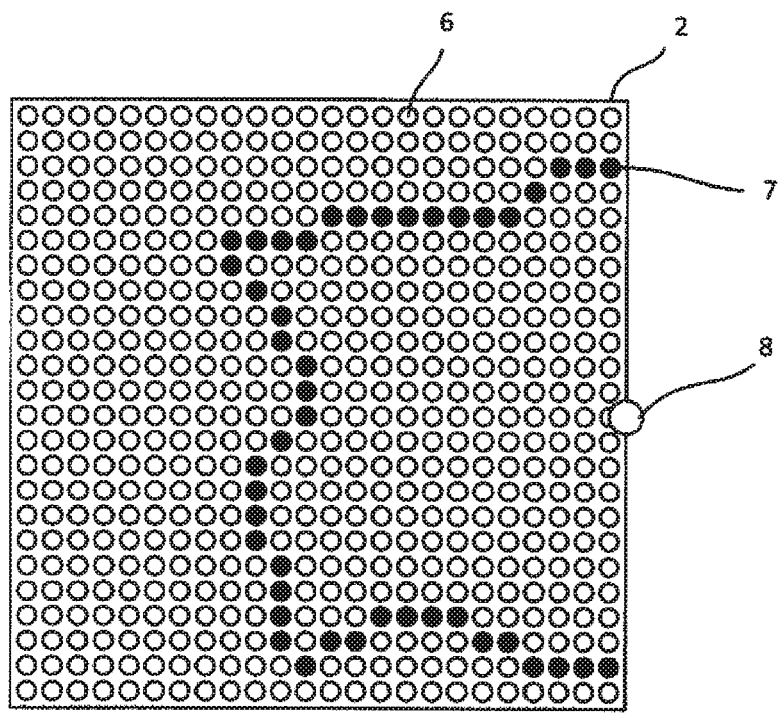
FIG. 3 shows a plan view of a surface with LEDs in the form of dots.

FIG. 3 shows a more detailed plan view of a surface 2 which is equipped with LEDs 6, 7 arranged in a matrix-like manner. The contour of the safety area of a machine (not illustrated) is marked by illuminating LEDs 7, whereas the rest of the LEDs 6 are in an inactive operating mode.

In addition to the visible marking 7 of the safety area, a laser scanner 8 for monitoring the safety area is also used in this exemplary embodiment. The safety area, the marking 7 of the safety area and the laser scanner 8 are coupled by means of the control device. The laser scanner (for example by rotary scanning) can thus monitor the safety area for objects located therein, such as articles or individuals. If an object is identified by the laser scanner 8, the distance of the laser scanner from the object can thus be determined by the control device, and on this basis it is possible to determine whether there is a breach of the safety area.

If a breach is detected, the control device can thus initiate the shutdown of the machine around which the safety area it is located. Furthermore, in the event of a breach of the safety area, a warning or alarm signal in the form of flashing LEDs can be generated.

Instead of the laser scanner shown in FIG. 3, further, other monitoring devices can also be used in order to identify a breach of the marked safety area.

Figure 4:
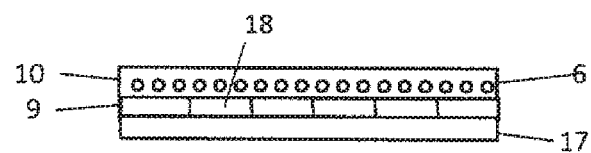
FIG. 4 shows a cross-section of a multi-layer surface covering formed of LEDs and sensor cells.
Figure 5:
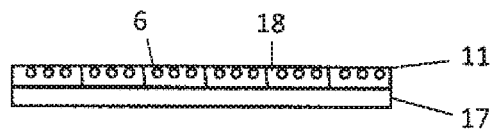
FIG. 5 shows a cross-section of a combined light-sensor mat.

In accordance with an exemplary embodiment illustrated in FIGS. 4 and 5, the floor in the working area can comprise additional tactile sensors, by means of which it is possible to identify whereabouts within the working area individuals are residing.

A possible floor structure in accordance with this exemplary embodiment is shown in FIG. 4. Here, two additional layers 9 and 10 are applied to the floor 17. The lower of the two layers consists of a tactile sensor mat 9, which is divided into a plurality of sensor cells 18. An entering of the floor by a person can be detected in a spatially resolved manner by the sensor cells. The information relating to the location and type of entering is then transmitted to the control device.

The upper of the two layers shown in FIG. 4 comprises an LED mat, by means of which regularly arranged, multi-colour RGB LEDs are applied to the floor. These LEDs can be controlled individually by the control device, whereby it is possible to identify a safety area in a flexible and precise manner by means of an illuminating LED marking. It is also possible, by means of the use of LED mats on which the LEDs are arranged closely to one another, to visualise other warnings provided by illuminating RGB LEDs, which can reproduce a broad colour spectrum.

Here, each sensor cell 18 is locally assigned a number of LEDs 6 and virtually linked by the control device, so that it is possible to actuate selectively the LEDs assigned to a sensor cell 18 if contact of the sensor cell 18 has been detected.

In accordance with a further exemplary embodiment, the sensor cells and LEDs, as shown in FIG. 5, are applied as a combined light-sensor mat 11 to the floor 17. Here, the light-sensor mat 11 consists of a plurality of sensor cells 18, each of which is fixedly assigned a number of LEDs 6. A direct, fixedly linked assignment between sensor cells and LEDs is provided by a combined light-sensor mat.

In accordance with a further exemplary embodiment, not shown in the drawings, the LED mats, the sensor mats, and the combined light-sensor mats can also be laid on further surfaces, for example on walls, on tables, or on surfaces of a machine.

Figure 6:
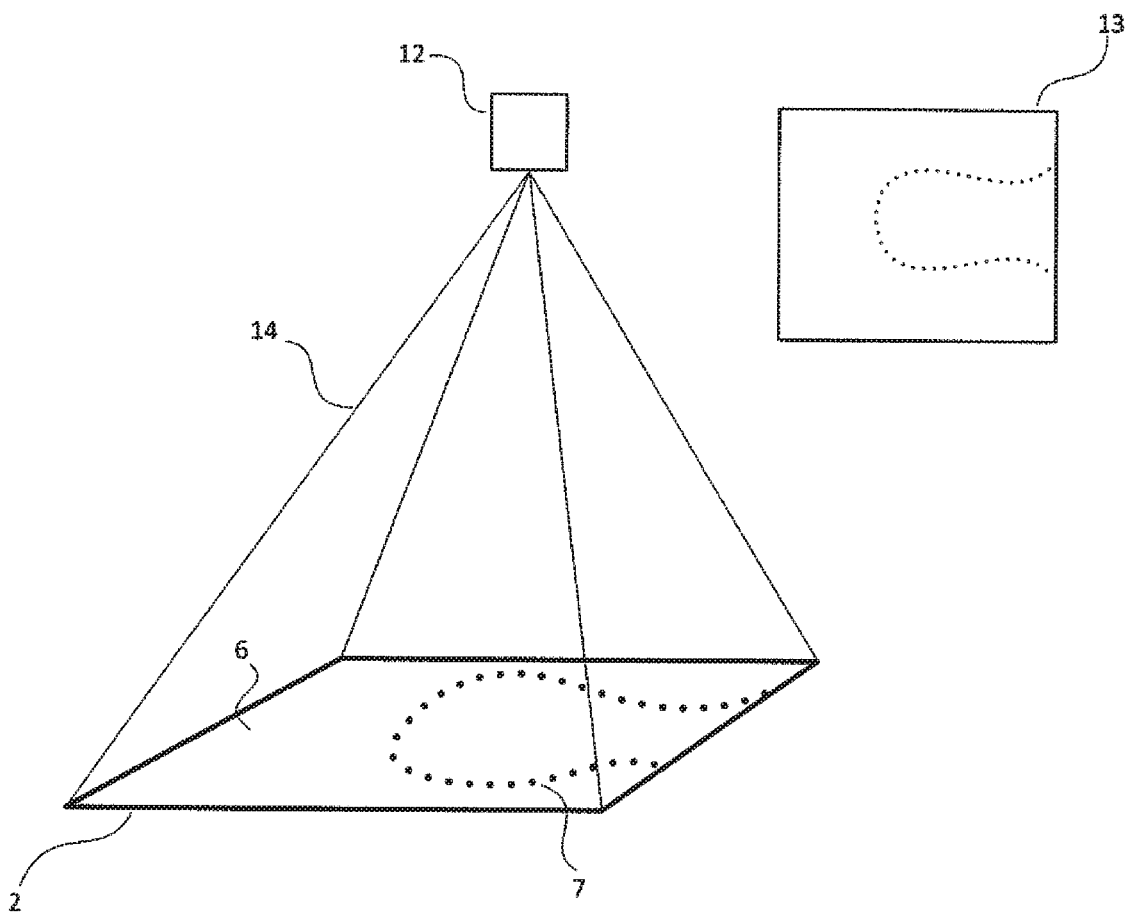
FIG. 6 shows an LED floor with additional camera monitoring.
Figure 7:
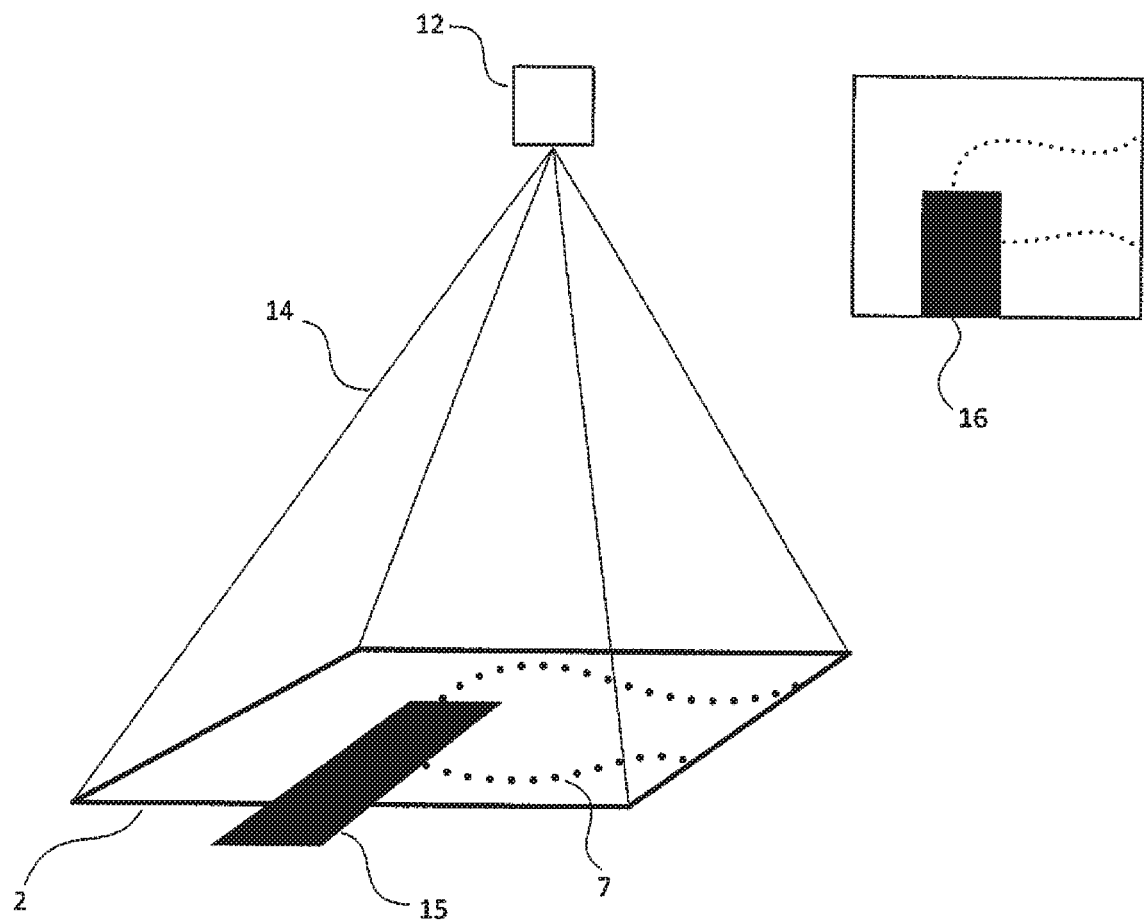
FIG. 7 shows the LED floor with camera monitoring from FIG. 6, wherein some of the LEDs are covered.

A further embodiment of the LED floor with an additional camera monitoring is shown in FIGS. 6 and 7. Here, the LEDs 6, 7 that mark a safety area of a floor 2 of a working area are detected by a camera 12. The monitoring device receives information from the control device regarding the target image, consisting of the currently active LEDs and their coordinates in the working area. The monitoring device furthermore receives a current image 13 of a monitoring area 14 of the camera 12 by means of the camera 12.

The light emitted by the LEDs can lie here in a visible or non-visible spectrum (infrared). The camera is then adapted to the particular wavelength in order to avoid external influences. Depending on the size and design of the working area, camera systems having a plurality of cameras can also be used.

The recorded current image is compared with the target image, wherein it is sufficient merely to compare the pixels of the relevant coordinates of the illuminating marking by addition or subtraction. If the current image 13 corresponds to the target image, as is shown in FIG. 6, no breach of the safety area is detected by the monitoring device.

If, however, as shown in FIG. 7, some of the LEDs 7 of the illuminating marking are covered, this can indicate the fact that an individual has infiltrated the safety area of the machine. In this case, the current image 13' no longer corresponds to the target image. This discrepancy between the two images is detected by the monitoring device and transmitted to the control device. The control device then stops the hazardous operation or the movement of the machine located in the safety area and triggers an alarm.

In accordance with a further embodiment, it is also possible to combine the tactile floor as shown in FIGS. 4 and 5 with the camera monitoring as shown in FIGS. 6 and 7. Besides the marking of the safety area, a double, redundant monitoring with diverse sensor principles of the safety area is thus provided, so that, in the event of failure or defective behaviour of one of the monitoring systems, a high level of safety can nevertheless be guaranteed for the individuals in a working area shared by humans and robots.

The application relates, inter alia, to the following aspects:

1. A device for securing a safety area around at least one automatically operating machine (3), comprising
    a visible or invisible illuminating marking (4; 5), which is arranged on or in at least one surface (2) delimiting the safety area and by means of which at least part of the safety area and/or at least part of a boundary of the safety area is marked,
    a control device (1) configured to control the machine (3) and/or to define the safety area from an operating state of the machine (3) and/or to control a shape, a structure and/or a location of the illuminating marking (4; 5), characterised in that
    a multiplicity of light sources (6, 7) which can be actuated in a spatially resolved manner is arranged on or in the surface (2) delimiting the safety area
    each of the light sources (6, 7) comprises an inactive and at least one active operating mode, wherein the operating mode of the light sources can be controlled by way of the control device, and
    the illuminating marking (4; 5) is formed as at least one of the light sources (6,7) in an active operating mode.
2. The securing device according to any one of the previous aspects, characterised in that the control device (1), in the event of a movement of the machine (3), is configured to change the safety area dynamically and in correspondence with the movement of the machine (3).
3. The securing device according to any one of the previous aspects, characterised in that the control device (1) is also configured to change the safety area depending on a change in the operating state of the machine (3).
4. The securing device according to any one of the previous aspects, characterised in that the control device (1) is configured to change the marking (4; 5) and/or the operating mode of at least one of the light source (6, 7) in the event of a change of the safety area.
5. The securing device according to any one of the previous aspects, characterised in that the operating mode of each of the light sources (6, 7) can be controlled individually by the control device (1).
6. The securing device according to any one of the previous aspects, characterised in that the light sources (6, 7) can be modulated by the control unit (1) in respect of their colour, brightness and/or frequency.
7. The securing device according to any one of the previous aspects, characterised in that the control device (1) is also configured to divide the safety area into at least a first and a second safety area, wherein at least part of the first safety area and/or at least part of a boundary of the first safety area, and at least part of the second safety area and/or at least part of a boundary of the second safety area is marked by the illuminating marking (4; 5).
8. The securing device according to any one of the previous aspects, characterised in that at least two different safety areas and/or safety levels of a safety area that are disjunct, nested one inside the other and/or overlapping are marked by different colours, brightnesses and/or frequencies of the light sources (6, 7).
9. The securing device according to any one of the previous aspects, characterised in that the light sources (6, 7) are formed in a dot-like manner, and/or in that the light sources (6, 7) are arranged on or in the surface (2) regularly and/or in a matrix-like manner and/or close-meshed with a maximum spacing of 10 cm.

10. The securing device according to any one of the previous aspects, characterised in that at least some of the multiplicity of light sources (6, 7) are arranged on or in light mats (10).

11. The securing device according to any one of the previous aspects, characterised in that a sensor-based monitoring device is also comprised, by means of which a breach of the safety area can be detected, and the control device (1) is also configured to change the operating state of the machine (3) and/or to change the operating mode of at least one light source (6, 7) and/or to trigger an alarm depending on a detection of a breach of the safety area by the monitoring device.

12. The securing device according to aspect 11, characterised in that the monitoring device comprises a spatially resolving, touch-sensitive sensor system with a multiplicity of sensor cells (18), which are arranged on or in the surface (2) delimiting the safety area (2).

13. The securing device according to aspect 12, characterised in that the monitoring device is designed to detect a breach of the safety area when contact above a defined threshold value is detected within the safety area by means of the sensor system.

14. The securing device according to aspect 12 or 13, characterised in that each of the multiplicity of sensor cells (18) is locally assigned at least one of the light sources (6, 7).

15. The securing device according to any one of aspects 12 to 14, characterised in that the multiplicity of light sources (6, 7) and sensor cells (18) are formed as combined light-sensor mats (11).

16. The securing device according to any one of aspects 11 to 15, characterised in that the monitoring device comprises a receiving device (12) for visually monitoring the illuminating marking of the safety area.

17. The securing device according to aspect 16, characterised in that the monitoring device is designed to detect a breach of the safety area when at least a predefined number of the light sources (6, 7) marking the safety area are not detected by the recording device (12).

18. The securing device according to any one of aspects 11 to 17, characterised in that the monitoring device is formed as a laser scanner (8).

19. Use of a device according to any one of aspects 1 to 18 to secure a safety area of a machine.

20. A method for securing a safety area of a machine, wherein the method comprises the following steps:
defining a safety area of a machine;
actuating light sources by means of a control device, in such a way that the safety area of the machine is marked.

The invention claimed is:

1. A device for securing a safety area around at least one automatically operating machine, comprising:
a visible or invisible illuminating marking, which is arranged on or in at least one surface delimiting the safety area and by means of which at least one of at least part of the safety area or at least part of a boundary of the safety area is marked,
a sensor-based monitoring device configured to detect a breach of the safety area,
a control device configured to control the machine and to change the safety area in correspondence with a movement of the machine and to control a location of the illuminating marking in correspondence with the changed safety area, and, depending on a detection of a breach of the safety area by the monitoring device, also configured to at least one of change an operating state of the machine and change an operating mode of at least one light source and to trigger an alarm,
wherein a multiplicity of light sources which can be actuated in a spatially resolved manner is arranged on or in the surface delimiting the safety area, wherein each of the light sources comprises an inactive and at least one active operating mode, wherein the operating mode of the light sources can be controlled by way of the control device, and wherein the illuminating marking is formed as multiple of the light sources in an active operating mode,
wherein upon a change of the safety area, at least one light source which is no longer required for the illuminating marking of the changed safety area is switched from an active operating mode to an inactive operating mode by the control device and at least one other light source which was previously in an inactive operating mode is switched into an active operating mode by the control device, thereby controlling the location of the illuminating marking in correspondence with the changed safety area, and wherein upon a change of the safety area, the monitoring device is further configured to detect a breach of the changed safety area.

2. The securing device according to claim 1, wherein the monitoring device comprises a spatially resolving, touch-sensitive sensor system with a multiplicity of sensor cells, which are arranged on or in the surface delimiting the safety area.

3. The securing device according to claim 2, wherein the monitoring device is designed to detect a breach of the safety area when contact above a defined threshold value is detected within the safety area by means of the sensor system.

4. The securing device according to claim 2, wherein each of the multiplicity of sensor cells is locally assigned at least one of the light sources.

5. The securing device according to claim 2, wherein the multiplicity of light sources and sensor cells are formed as combined light-sensor mats.

6. The securing device according to claim 1, wherein the monitoring device comprises a recording device for visually monitoring the illuminating marking of the safety area.

7. The securing device according to claim 6, wherein the monitoring device is designed to detect a breach of the safety area when at least a predefined number of the light sources marking the safety area are not detected by the recording device.

8. The securing device according to claim 1, wherein the monitoring device is formed as a laser scanner.

9. The securing device according to claim 1, wherein the light sources are arranged on or in the surface regularly and close-meshed with a maximum spacing of 10 cm.

10. The securing device according to claim 1, wherein the control device, in the event of a movement of the machine, is configured to change the safety area dynamically and in correspondence with the movement of the machine.

11. The securing device according to claim 1, wherein the control device is further configured to change the safety area depending on a change in the operating state of the machine.

12. The securing device according to claim 1, wherein the control device is configured, in the event of a change to the safety area, to change at least one of the marking or the operating mode of at least one of the light sources.

13. The securing device according to claim 1, wherein the control device is further configured to control the operating mode of each of the light sources individually.

14. The securing device according to claim 1, wherein the control device is further configured to modulate the light sources in respect of at least one of their color, brightness or frequency.

15. The securing device according to claim 1, wherein the control device is also configured to divide the safety area into at least a first and a second safety area, and wherein at least part of the first safety area or at least part of a boundary of the first safety area, and at least part of the second safety area or at least part of a boundary of the second safety area is marked by the illuminating marking.

16. The securing device according to claim 1, wherein at least two different safety areas or safety levels of a safety area that are disjunct, nested one inside the other, or overlapping are marked by at least one of different colors, different brightnesses, or different frequencies of the light sources.

17. The securing device according to claim 1, wherein at least a subset of the multiplicity of light sources are arranged on or in light mats.

18. Use of a device according to claim 1 to secure a safety area of a machine.

19. A method for securing a safety area of a machine, wherein the method comprises the following steps:
- defining the safety area of the machine;
- actuating light sources by means of a control device, in such a way that the safety area of the machine is marked by a visible or invisible illuminating marking which is arranged on or in at least one surface delimiting the safety area of the machine;
- changing the safety area of the machine in correspondence with a movement of the machine;
- controlling a location of the marked safety area in correspondence with the changed safety area;
- actuating the light sources by means of the control device, in such a way that the changed safety area is marked, wherein upon a change of the safety area, at least one light source which is no longer required for the illuminating marking of the changed safety area is switched from an active operating mode to an inactive operating mode by the control device and at least one other light source which was previously in an inactive operating mode is switched into an active operating mode by the control device, thereby controlling the location of the illuminating marking in correspondence with the changed safety area; and
- upon a change of the safety area, detecting a breach of the changed safety area.

20. The method of claim 19, further comprising:
- dividing the safety area into at least a first and a second safety area, wherein at least part of the first safety area or at least part of a boundary of the first safety area, and at least part of the second safety area or at least part of a boundary of the second safety area is marked by the actuating light sources.

* * * * *